United States Patent
Tarimala et al.

(10) Patent No.: US 11,356,894 B2
(45) Date of Patent: Jun. 7, 2022

(54) METHOD AND APPARATUS FOR CONFIGURING UPLINK HYBRID AUTOMATIC REPEAT REQUEST (HARQ) RETRANSMISSION TIMER FOR NARROWBAND COMMUNICATIONS

(71) Applicant: QUALCOMM Incorporated, San Diego, CA (US)

(72) Inventors: Raghuveer Ramakrishna Srinivas Tarimala, Hyderabad (IN); Liangchi Hsu, San Diego, CA (US); Praveen Maruthoormana Purushothaman, Ernakulam (IN); Srikanth Menon, Hyderabad (IN); Raghavendra Shyam Ananda, Hyderabad (IN); Prasad Reddy Kadiri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 86 days.

(21) Appl. No.: 16/861,549

(22) Filed: Apr. 29, 2020

(65) Prior Publication Data
US 2020/0367097 A1  Nov. 19, 2020

(30) Foreign Application Priority Data

May 14, 2019  (IN) .............................. 201941019185

(51) Int. Cl.
*H04W 28/04*  (2009.01)
*H04W 74/08*  (2009.01)
(Continued)

(52) U.S. Cl.
CPC .............. *H04W 28/04* (2013.01); *H04L 1/188* (2013.01); *H04W 74/006* (2013.01); *H04W 74/0833* (2013.01)

(58) Field of Classification Search
CPC ..... H04L 1/188; H04L 1/1887; H04L 1/1896; H04W 28/04; H04W 74/006; H04W 74/0833
See application file for complete search history.

(56) References Cited

U.S. PATENT DOCUMENTS

2010/0322172 A1  12/2010 Hsu
2017/0013565 A1*  1/2017 Pelletier .............. H04W 52/365
(Continued)

OTHER PUBLICATIONS

International Search Report and Written Opinion—PCT/US2020/031293—ISA/EPO—dated Jul. 20, 2020.
(Continued)

*Primary Examiner* — Gary Mui
(74) *Attorney, Agent, or Firm* — Holland & Hart LLP

(57) ABSTRACT

There is a need to support HARQ retransmission for narrow-band communications. The present disclosure provides a solution by supporting a HARQ retransmission timer for narrow-band communications. In an aspect of the disclosure, a method, a computer-readable medium, and an apparatus are provided. The method for wireless communication at a user equipment may include receiving, by a user equipment (UE), a hybrid automatic repeat request (HARQ) retransmission timer, the HARQ retransmission timer indicates a time interval, identifying, by the (UE), data for uplink transmission, and starting, by the UE and after expiration of the HARQ retransmission timer, a random access procedure to obtain an uplink grant for the data.

30 Claims, 11 Drawing Sheets

(51) Int. Cl.
H04W 74/00 (2009.01)
H04L 1/18 (2006.01)

(56) References Cited

U.S. PATENT DOCUMENTS

| | | | | |
|---|---|---|---|---|
| 2017/0264398 | A1* | 9/2017 | Uchino | H04L 5/1469 |
| 2018/0279375 | A1* | 9/2018 | Jeon | H04W 74/0833 |
| 2018/0368175 | A1* | 12/2018 | Jeon | H04W 72/04 |
| 2019/0007176 | A1* | 1/2019 | Ozturk | H04L 1/1819 |
| 2019/0053322 | A1* | 2/2019 | Wu | H04W 72/0406 |
| 2019/0116630 | A1* | 4/2019 | Fan | H04L 1/1854 |
| 2019/0190661 | A1* | 6/2019 | You | H04W 72/14 |
| 2019/0289638 | A1* | 9/2019 | Kung | H04L 1/1812 |
| 2019/0327638 | A1* | 10/2019 | Liu | H04W 52/02 |
| 2020/0245334 | A1* | 7/2020 | Phuyal | H04L 1/1877 |
| 2020/0259601 | A1* | 8/2020 | Zhou | H04L 5/0085 |
| 2021/0029730 | A1* | 1/2021 | Lou | H04L 1/18 |

OTHER PUBLICATIONS

Lenovo et al: "UL transmission in preconfigured resources for NbIoT", 3GPP Draft; R1-1906280, 3rd Generation Partnership Project (3Gpp), Mobile Competence Centre; 650 Route Des Lucioles; F-06921 Sophia-Antipolis Cedex; France, vol. RAN WG1, No. Reno, USA; May 13, 2019-May 17, 2019, May 13, 2019 (May 13, 2019), XP051727732, Retrieved from the Internet: URL: http://www.3gpp.org/ftp/Meetings%5F3GPP%5FSYNC/RAN1/Docs/R1%2D1906280%2Ezip [retrieved on May 13, 2019] section 2.1.1-section 2.1.3.

* cited by examiner

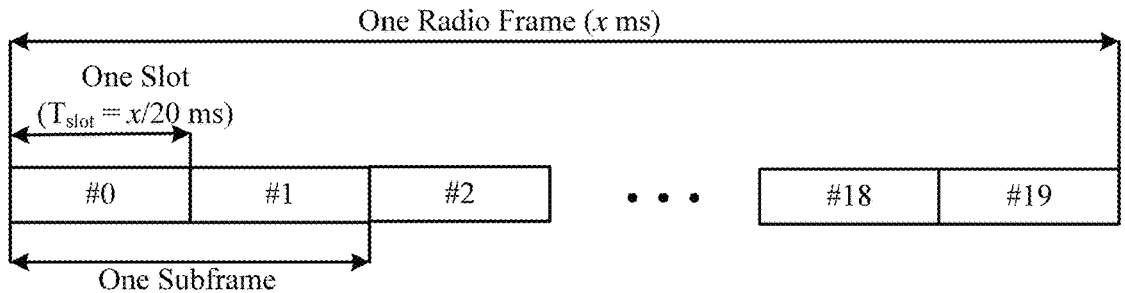
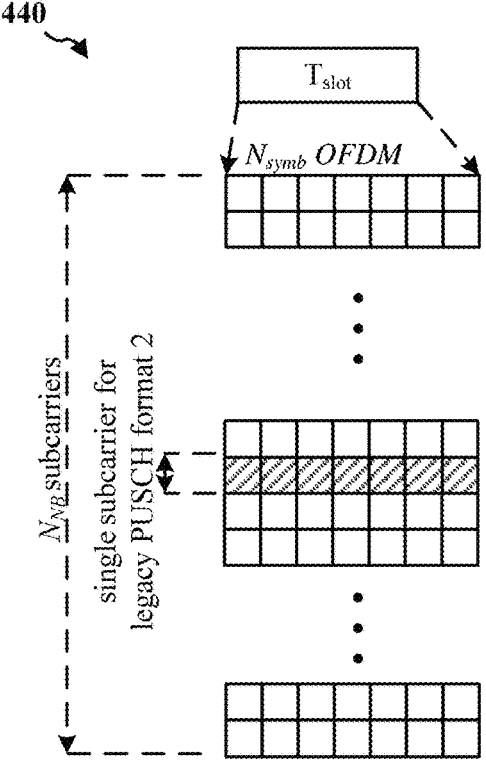
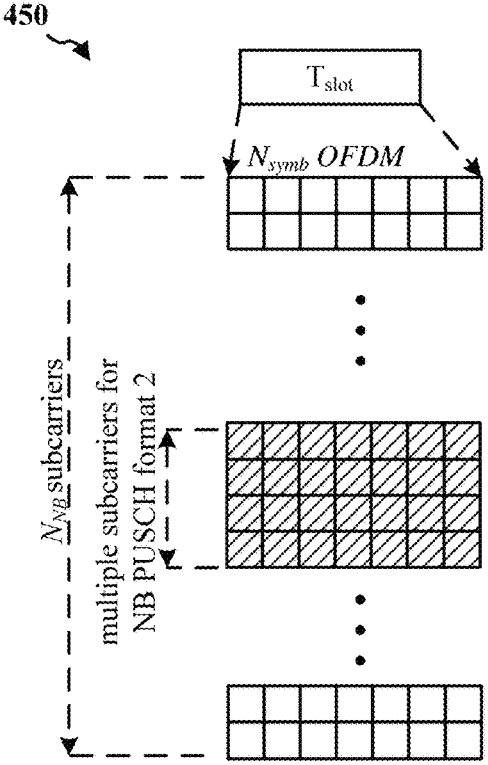
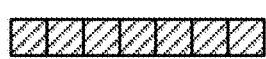
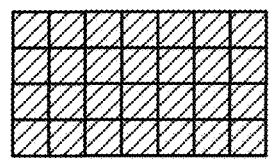
FIG. 4A

METHOD AND APPARATUS FOR CONFIGURING UPLINK HYBRID AUTOMATIC REPEAT REQUEST (HARQ) RETRANSMISSION TIMER FOR NARROWBAND COMMUNICATIONS

CROSS-REFERENCE TO RELATED APPLICATIONS

The application claims the benefit of Indian Patent Application Serial No. 201941019185 entitled "METHOD AND APPARATUS FOR CONFIGURING UPLINK HYBRID AUTOMATIC REPEAT REQUEST (HARQ) RETRANSMISSION TIMER FOR NARROWBAND COMMUNICATIONS" which was filed on May 14, 2019. The aforementioned application is hereby expressly incorporated herein by reference in its entirety.

FIELD OF DISCLOSURE

The present disclosure relates generally to communication systems, and more particularly, to a method and apparatus for configuring uplink hybrid automatic repeat request (HARQ) retransmission timer for narrow-band communications.

DESCRIPTION OF RELATED ARTS

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrow-band communications involve communicating with a limited frequency bandwidth as compared to the frequency bandwidth used for LTE communications. One example of narrow-band communication is narrow-band (NB) Internet of Things (IoT) (NB-IoT) communication, which is limited to a single resource block (RB) of system bandwidth, e.g., 180 kHz. Another example of narrow-band communication is enhanced machine-type communication (eMTC), which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. There is a need to support narrow-band TDD frame structure for narrow-band communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrow-band communications involve communicating with a limited frequency bandwidth as compared to the frequency bandwidth used for LTE communications. One example of narrow-band communication is NB-IoT communication, which is limited to a single RB of system bandwidth, e.g., 180 kHz. Another example of narrow-band communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrow-band communications may include reaching challenging locations (e.g., a smart gas meter located in the basement of a building) there is an increased chance that one or more transmissions will not be properly received. Consequently, narrow-band communications may include a predetermined number of repeated transmissions to increase the chance of having the transmission properly decoded. There is a need to support narrow-band TDD frame structure for narrow-band communications.

The present disclosure provides a solution by supporting HARQ retransmission timer for narrow-band communications. In an aspect of the disclosure, a method, a computer-readable medium, and an apparatus are provided. The method for wireless communication at a user equipment may include receiving, by a user equipment (UE), a hybrid automatic repeat request (HARQ) retransmission timer, the HARQ retransmission timer indicates a time interval. The method may also include identifying, by the (UE), data for uplink transmission. The method may further include starting, by the UE and after expiration of the HARQ retransmission timer, a random access procedure to obtain an uplink grant for the data.

The present disclosure may include a method where the UE is a narrow-band communication device. For example, the UE is a narrow-band Internet of Things (NB-IoT) device. The method may include the HARQ retransmission timer is included in a system information block (SIB). The method may include the HARQ retransmission timer is included in SIB2. The method may include the UE is in a connected mode. The method may further include determining whether the HARQ retransmission timer has expired. The method may further include waiting to start the random access procedure based at least in part on the determination that the HARQ retransmission timer has not expired. The method may further include transmitting a second uplink information to a base station and storing the ACK/NACK information. The method may include the data for uplink transmission is identified after transmitting the second uplink information to the base station. The method may include the data for uplink transmission has a higher priority than the second uplink information.

The present disclosure may include an apparatus for wireless communication. The apparatus may include a memory; and one or more processors operatively coupled to the memory. The one or more processors may be configured to receive a hybrid automatic repeat request (HARQ) retransmission timer, the HARQ retransmission timer indicates a time interval. The one or more processors may be configured to identify data for uplink transmission. The one or more processors may be configured to start, after expiration of the HARQ retransmission timer, a random access procedure to obtain an uplink grant for the data.

The present disclosure may include an apparatus where the apparatus is a narrow-band communication device. For example, the apparatus is a narrow-band Internet of Things (NB-IoT) device. The apparatus may include the HARQ retransmission timer is included in a system information block (SIB). The apparatus may include the HARQ retransmission timer is included in SIB2. The apparatus is in a connected mode. The apparatus may include one or more processors further configured to determine whether the HARQ retransmission timer has expired. The apparatus may include the one or more processors further configured to wait to start the random access procedure based at least in part on the determination that the HARQ retransmission timer has not expired. The apparatus may include the one or more processors further configured to transmit a second uplink information to a base station and store the second uplink information. The apparatus may include the data for uplink transmission is identified after transmitting the second uplink information to the base station. The apparatus may include the data for uplink transmission has a higher priority than the second uplink information.

The present disclosure may include an apparatus for wireless communication. The apparatus may include means for receiving a hybrid automatic repeat request (HARQ) retransmission timer, the HARQ retransmission timer indicates a time interval. The apparatus may also include means for identifying data for uplink transmission. The apparatus may further include means for starting, after expiration of the HARQ retransmission timer, a random access procedure to obtain an uplink grant for the data.

The present disclosure may include the apparatus is a narrow-band communication device. For example, the apparatus is a narrow-band Internet of Things (NB-IoT) device. The apparatus may include the HARQ retransmission timer is included in a system information block (SIB). The apparatus may include the HARQ retransmission timer is included in SIB2. The apparatus may be a UE in a connected mode. The apparatus may further include means for determining whether the HARQ retransmission timer has expired. The apparatus may further include means for waiting to start the random access procedure based at least in part on the determination that the HARQ retransmission timer has not expired. The apparatus may further include means for transmitting a second uplink information to a base station and means for storing the second uplink information. The apparatus may include the data for uplink transmission is identified after transmitting the second uplink information to the base station. The apparatus may include the data for uplink transmission has a higher priority than the second uplink information.

The present disclosure may include a non-transitory computer-readable medium storing one or more instructions for wireless communication. The one or more instructions may include one or more instructions that, when executed by one or more processors of a user equipment (UE), cause the one or more processors to receive, by the UE, a hybrid automatic repeat request (HARQ) retransmission timer, the HARQ retransmission timer indicates a time interval, identify, by the (UE), data for uplink transmission, and start, by the UE and after expiration of the HARQ retransmission timer, a random access procedure to obtain an uplink grant for the data.

The present disclosure may include the non-transitory computer-readable medium where the UE is a narrow-band communication device. For example, the UE is a narrow-band Internet of Things (NB-IoT) device. The non-transitory computer-readable medium may include the HARQ retransmission timer is included in a system information block (SIB). The non-transitory computer-readable medium may include the HARQ retransmission timer is included in SIB2. The non-transitory computer-readable medium may include the UE is in a connected mode. The non-transitory computer-readable medium may further include one or more instructions that cause the one or more processors to determine whether the HARQ retransmission timer has expired. The non-transitory computer-readable medium may further include one or more instructions that cause the one or more processors to wait to start the random access procedure based at least in part on the determination that the HARQ retransmission timer has not expired. The non-transitory computer-readable medium may further include one or more instructions that cause the one or more processors to transmit a second uplink information to a base station and store the second uplink information. The non-transitory computer-readable medium may include the data for uplink transmission is identified after transmitting the second uplink information to the base station. The non-transitory computer-readable medium may include the data for uplink transmission has a higher priority than the second uplink information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A is a diagram illustrating example narrow-band PUSCH formats, in accordance with various aspects of the present disclosure.

DETAILED DESCRIPTION

Figure 1:
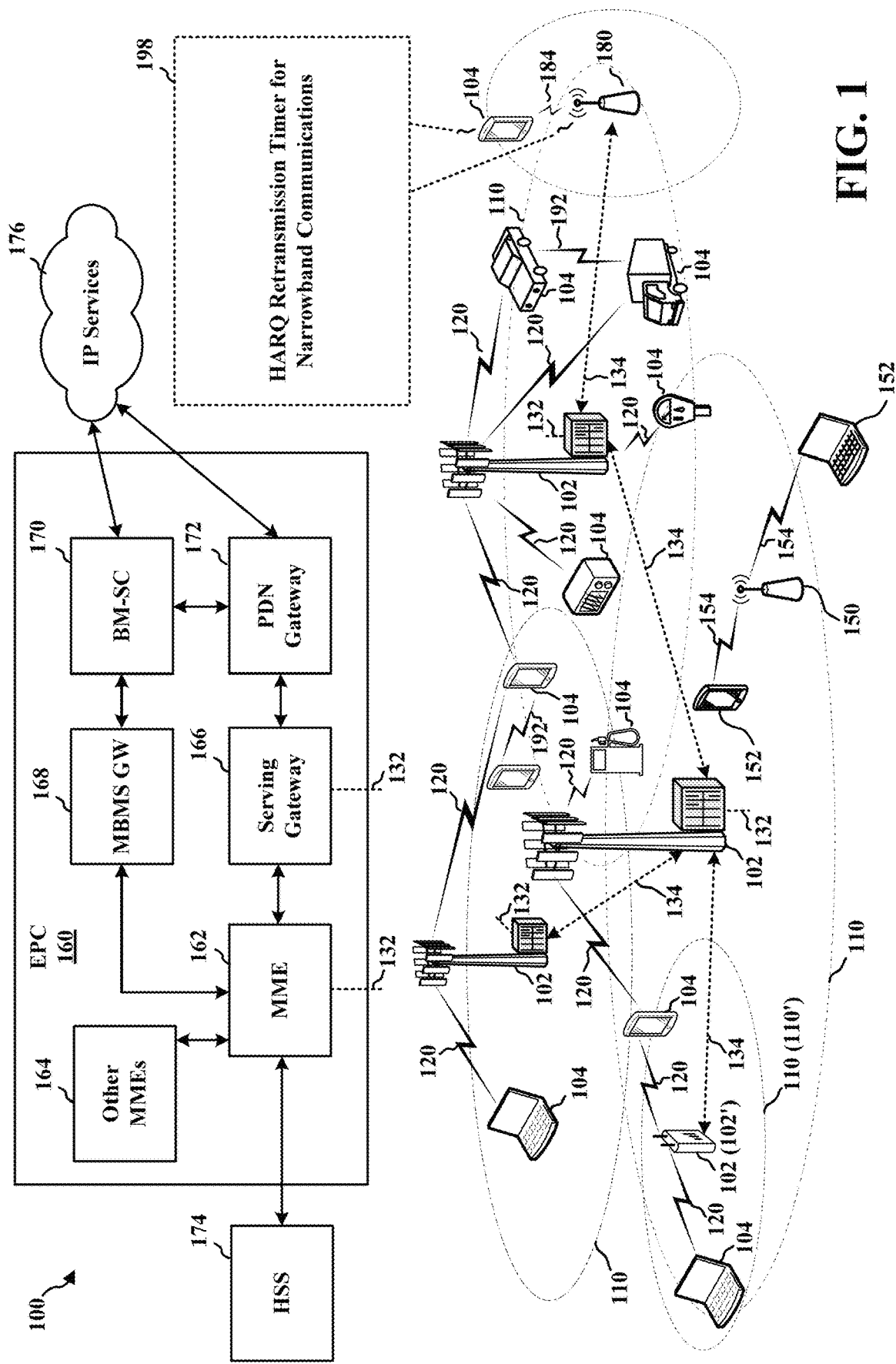
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Generally, the described techniques provide for a wireless device (e.g., NB-IoT device) performing hybrid automatic repeat request (HARQ) retransmission for narrow-band communications. In various aspects of the present disclosure, a scheduling request (SR) procedure may not be available to a user equipment for narrow-band Internet of Things communications (e.g., NB-IoT). Therefore, when the user equipment for narrow-band Internet of Things communications (e.g., NB-IoT) have data for uplink transmission, the user equipment for narrow-band Internet of Things communications (e.g., NB-IoT) may initiate a random access procedure (RACH) to transmit the data. In some wireless communication systems, a user equipment (UE) and a base station may establish communication using a random access procedure. For instance, the random access procedure may include a plurality of messages exchanged between the UE and the base station. In some examples, random access procedures may be used by the UE to access/connect to a base station. In other examples, random access procedure may be used when the UE is handed over from a source base station to a target base station. In other examples, the random access procedure may enable the UE to synchronize with the network and communicate with the base station.

In various aspects of the present disclosure, the user equipment for narrow-band Internet of Things communications (e.g., NB-IoT) may transmit uplink information (e.g., uplink data and/or uplink control information) to the base station and the base station may perform a HARQ procedure for the received uplink information. For example, the user equipment for narrow-band Internet of Things communications (e.g., NB-IoT) may transmit uplink information (e.g., uplink data and/or uplink control information) to the base station. The uplink information (e.g., uplink data and/or uplink control information) may be transmitted to the base station via narrow-band physical uplink shared channel (NPUSCH). The user equipment for narrow-band Internet of Things communications (e.g., NB-IoT) may store the uplink information (e.g., uplink data and/or uplink control information) in a memory for HARQ retransmission in the event that a decoding error occurred at the base station.

In an aspect, the base station may detect the NPUSCH and attempt to decode the uplink (e.g., uplink data and/or uplink control information) information transmitted from the user equipment for narrow-band Internet of Things communications (e.g., NB-IoT). If the base station is successful (e.g., no error) in decoding the uplink (e.g., uplink data and/or uplink control information) information, the base station may not provide any feedback to the user equipment for narrow-band Internet of Things communications (e.g., NB-IoT). The base station may provide an uplink grant for additional uplink transmission and a new data indicator (NDI) if the uplink information (e.g., uplink data and/or uplink control information) was successfully decoded. If the base station is not successful (e.g., cyclic redundancy checksum (CRC) error) in decoding the uplink information, the base station may provide an uplink grant without a new data indicator (NDI) bit.

In an aspect, the user equipment for narrow-band Internet of Things communications (e.g., NB-IoT) may retransmit the uplink information (e.g., uplink data and/or uplink control information) stored in the memory if an uplink grant is received without the NDI bit. In another aspect, the user equipment for narrow-band Internet of Things communications (e.g., NB-IoT) may discard the uplink information (e.g., uplink data and/or uplink control information) stored in the memory if an uplink grant is received with the NDI bit.

In various aspects of the present disclosure, from the time the user equipment for narrow-band Internet of Things communications (e.g., NB-IoT) transmits the uplink information and the time the user equipment for narrow-band Internet of Things communications (e.g., NB-IoT) receives an uplink grant without the NDI bit for retransmission of the uplink information stored in a memory, the user equipment for narrow-band Internet of Things communications (e.g., NB-IoT) may receive new data for uplink transmission. For example, the new data for uplink transmission may have a higher priority than the uplink information stored in the memory. As described above, the user equipment for narrow-band Internet of Things communications (e.g., NB-IoT) may neither have a scheduling request procedure available nor an uplink grant available for uplink transmission of the new data, the user equipment for narrow-band Internet of Things communications (e.g., NB-IoT) may perform a RACH procedure for the new data for uplink transmission. During the RACH procedure, the previous uplink information stored in the memory of the user equipment for narrow-band Internet of Things communications (e.g., NB-IoT) may be discarded prematurely (e.g., before receiving an uplink grant without the NDI bit for retransmission of the uplink information) and thus resulting in the failure of the HARQ retransmission.

In various aspects of the present disclosure, the user equipment for narrow-band Internet of Things communications (e.g., NB-IoT) may be configured with a HARQ retransmission timer. For example the HARQ retransmission timer may indicate a time interval where the user equipment for narrow-band Internet of Things communications (e.g., NB-IoT) may not initiate a RACH procedure after the transmission of the uplink information (e.g., uplink data and/or uplink control information) to the base station and/or the storage of the uplink information (e.g., uplink data and/or uplink control information) in the memory of the user equipment for narrow-band Internet of Things communications (e.g., NB-IoT). In an example, the user equipment for narrow-band Internet of Things communications (e.g., NB-IoT) may transmit uplink information (e.g., uplink data and/or uplink control information) to the base station and/or store the uplink information (e.g., uplink data and/or uplink control information) for retransmission, the HARQ retransmission timer may be triggered/initiated by the user equipment for narrow-band Internet of Things communications (e.g., NB-IoT) and before the expiration of the HARQ retransmission timer the user equipment for narrow-band Internet of Things communications (e.g., NB-IoT) may not initiate a RACH procedure even when new data for uplink transmission is received. The HARQ retransmission timer may reduce the uncertainty due to a lack of HARQ feedback from the base station (as described above). Also, the HARQ retransmission timer may reduce a number of RACH procedures performed by the user equipment for narrow-band Internet of Things communications (e.g., NB-IoT) and therefore reduce the RACH load on the base station. Further, the HARQ retransmission timer may allow the HARQ retransmission to be successfully performed and therefore reduce the HARQ retransmission failure of the user equipment for narrow-band Internet of Things communications (e.g., NB-IoT).

FIG. 1 is a diagram illustrating an example of a wireless communications system and an access network 100 in accordance with various aspects of the present disclosure. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, an eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/UE 104 may be configured to support a hybrid automatic repeat request (HARQ) retransmission timer for narrow-band communications (198), e.g., as described below in connection to any of FIGS. 5-10.

Figure 2:
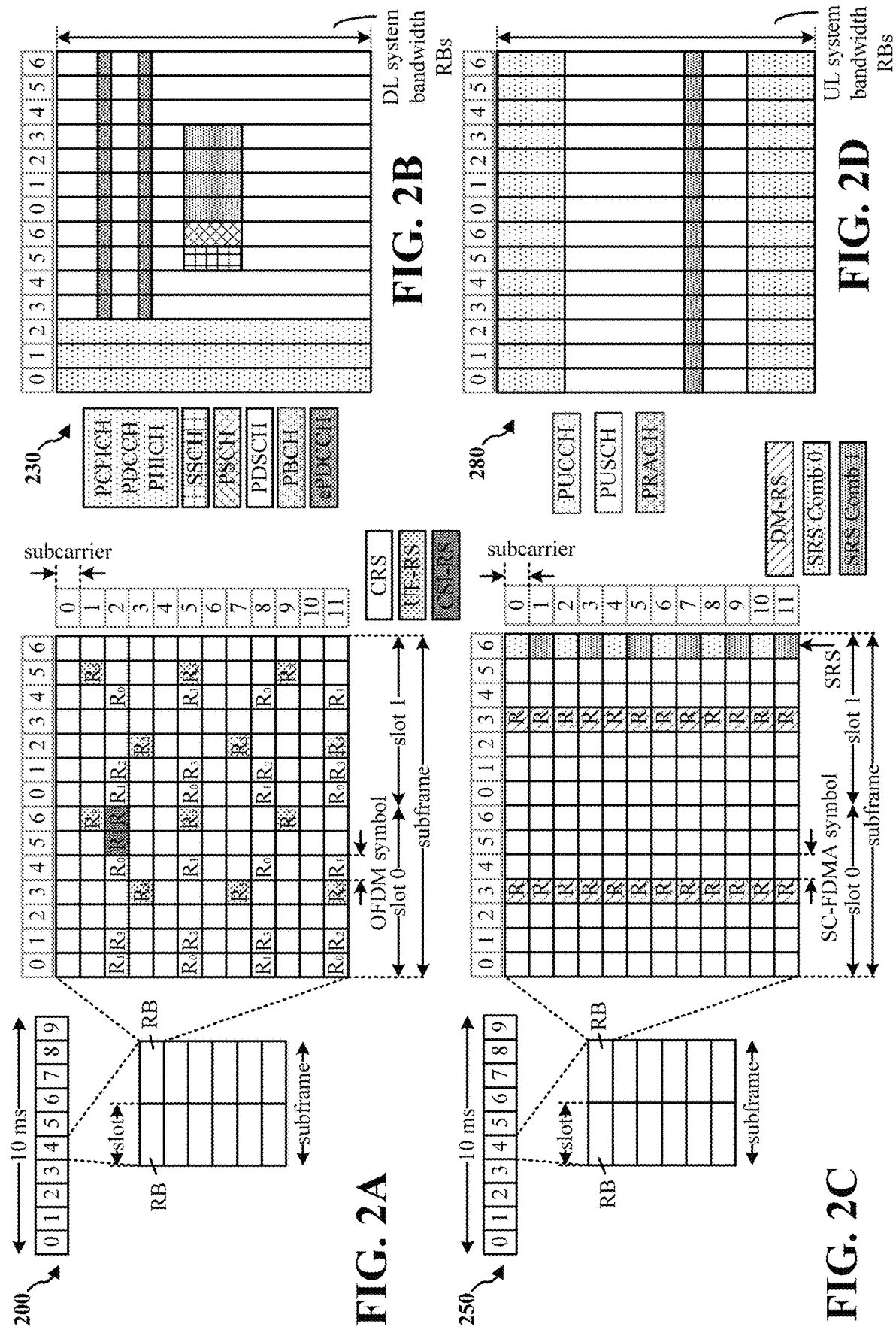
FIGS. 2A, 2B, 2C, and 2D are diagrams illustrating LTE examples of a DL frame structure, DL channels within the DL frame structure, an UL frame structure, and UL channels within the UL frame structure, respectively, in accordance with various aspects of the present disclosure.

FIG. 2A is a diagram 200 illustrating an example of a DL frame structure of a communication system in accordance with various aspects of the present disclosure. FIG. 2B is a diagram 230 illustrating an example of channels within the DL frame structure of a communication system in accordance with various aspects of the present disclosure. FIG. 2C is a diagram 250 illustrating an example of an UL frame structure of a communication system in accordance with various aspects of the present disclosure. FIG. 2D is a diagram 280 illustrating an example of channels within the UL frame structure of a communication in accordance with various aspects of the present disclosure. Various wireless communication technologies may have different frame structures and/or different channels. In LTE communication system, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a PSS that is used by a UE to determine subframe timing and a physical layer identity. The secondary synchronization channel (SSCH) is within symbol 5 of slot 0 within subframes 0 and 5 of a frame, and carries an SSS that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
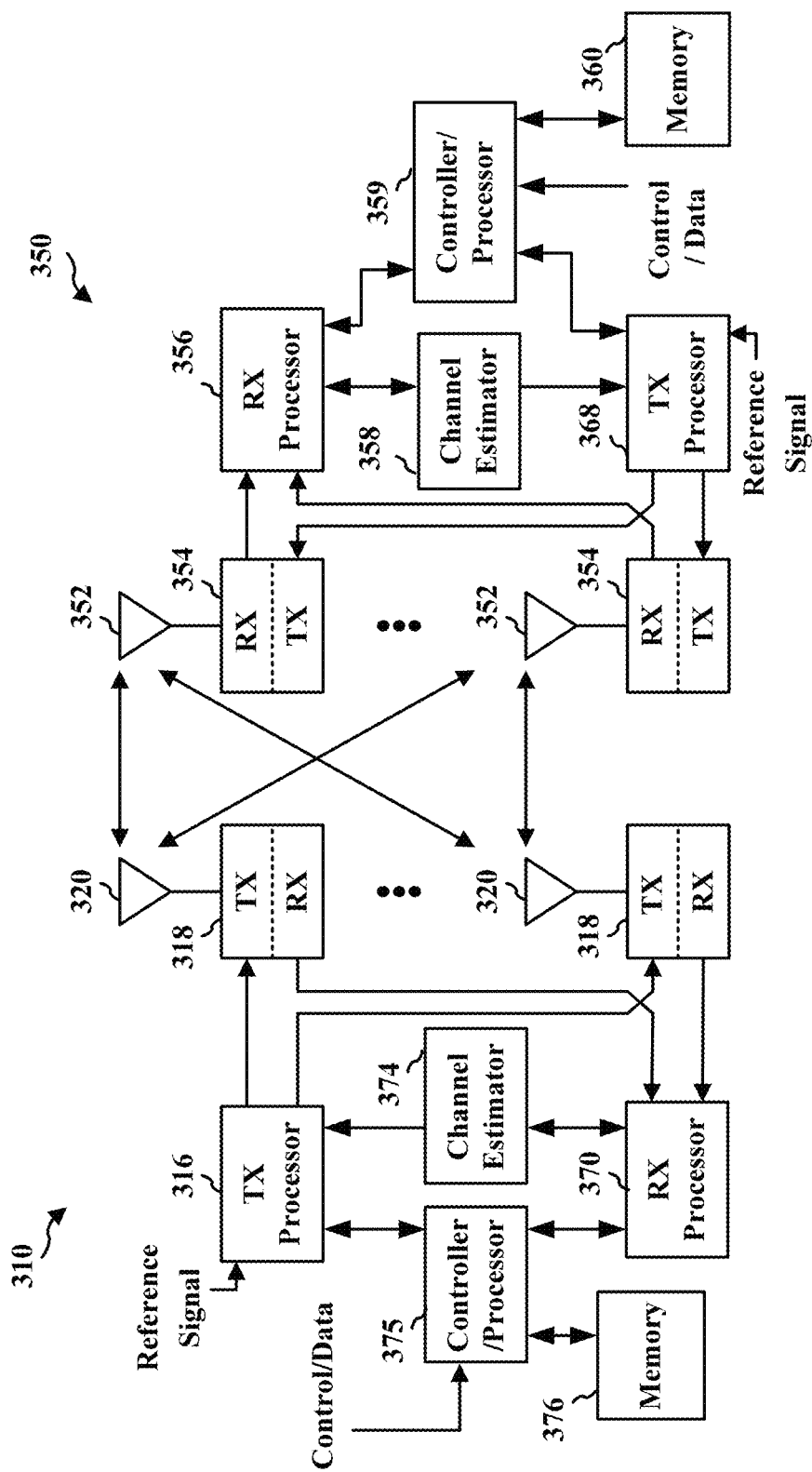
FIG. 3 is a diagram illustrating an example of a base station and a user equipment (UE) in an access network, in accordance with various aspects of the present disclosure.

FIG. 3 is a block diagram of a base station 310 in communication with a UE 350 in a wireless communication network in accordance with various aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrow-band communications involve communicating with a limited frequency bandwidth as compared to the frequency bandwidth used for LTE communications. One example of narrowband communication is narrow-band Internet of Things (NB-IoT) communication, which is limited to a single RB of system bandwidth, e.g., 180 kHz. Another example of narrow-band communication is eMTC, which is limited to six RBs of system bandwidth.

NB-IoT communication and eMTC may reduce device complexity, enable multi-year battery life, and provide deeper coverage to reach challenging locations such as deep inside buildings. However, because the coverage provided by narrow-band communications may include reaching challenging locations (e.g., a smart gas meter located in the basement of a building) there is an increased chance that one or more transmissions will not be properly received. Consequently, narrow-band communications may include a predetermined number of repeated transmissions to increase the chance of having the transmission properly decoded. There is a need to support narrow-band TDD frame structure for narrow-band communications.

The present disclosure provides a solution by supporting NPDCCH, NPDSCH, NPUCCH, and/or NPUSCH transmissions that use a narrow-band TDD frame structure.

FIG. 4A is a diagram illustrating a radio frame 440/450 that may be used for narrow-band communications in accordance with various aspects of the present disclosure.

Figure 4B:
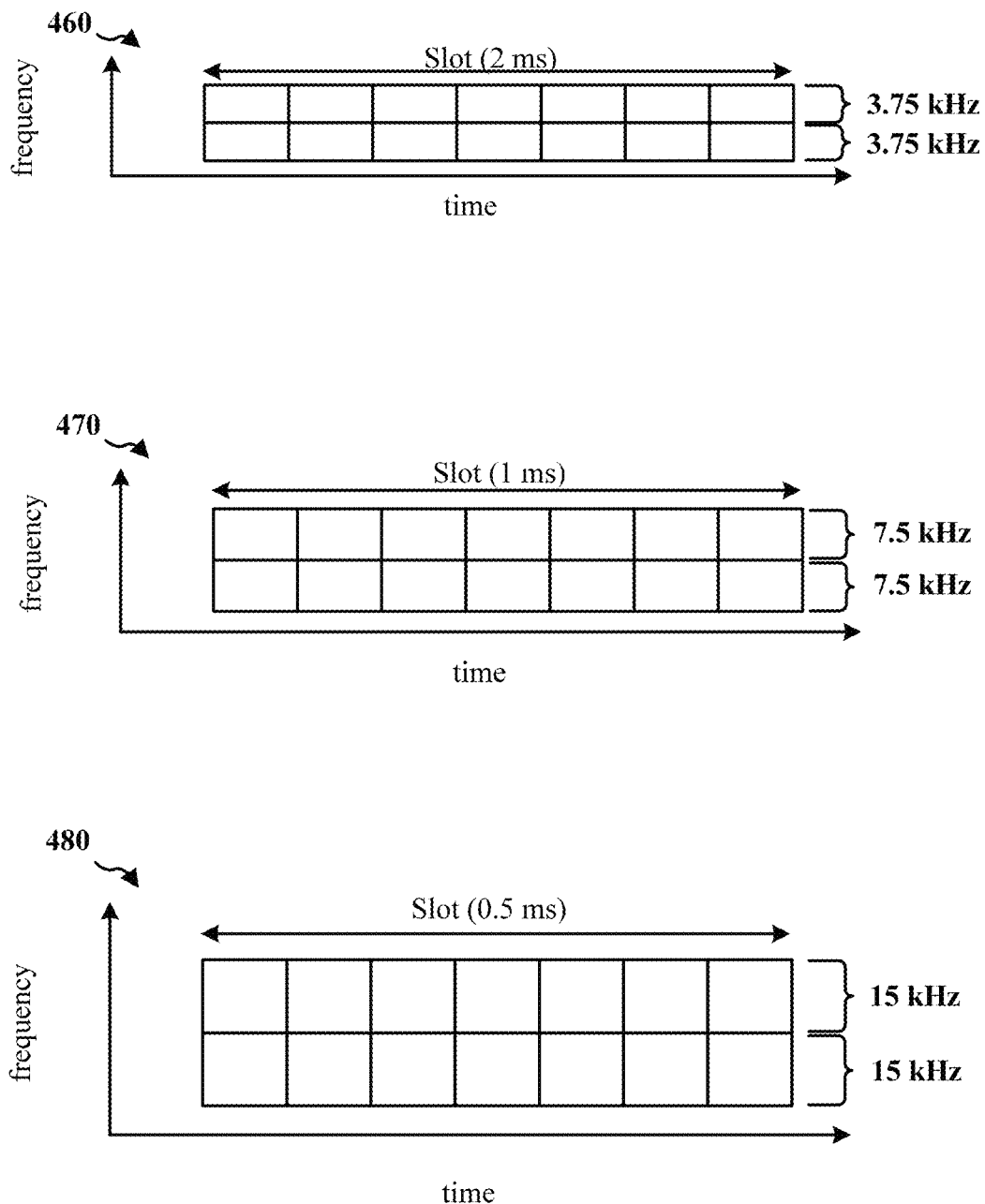
FIG. 4B is a diagram illustrating example narrow-band subcarrier frequency spacing, in accordance with various aspects of the present disclosure.

FIG. 4B is a diagram illustrating a 10 ms frame with a 15 kHz subcarrier spacing 480, a 20 ms frame with a 7.5 kHz subcarrier spacing 470, and a 40 ms frame with a 3.75 kHz spacing 460 in accordance with various aspects of the present disclosure.

Referring to FIGS. 4A and 4B, the radio frame may include a 10 ms frame, a 20 ms frame, or a 40 ms frame depending on the subcarrier spacing. For example, a 10 ms frame may have a 15 kHz subcarrier spacing (e.g., see item 480 in FIG. 4B). In addition, a 20 ms frame may have a 7.5 kHz subcarrier spacing (see, item 470 in FIG. 4B). Further, a 40 ms frame may have a 3.75 kHz spacing (see, item 460 in FIG. 4B).

In certain configurations, the radio frame may be split into 10 subframes that are each made up of 2 slots. Each of the slots may be x/20 ms in length depending on whether the frame is a 10 ms frame, a 20 ms frame, or a 40 ms frame. In one aspect, x may be equal to the length of the frame (e.g., 10 ms, 20 ms, or 40 ms). In other words, each slot in a 10 ms frame (e.g., 15 kHz subcarrier spacing) may be 0.5 ms in duration, each slot in a 20 ms frame (e.g., 7.5 kHz subcarrier spacing) may be 1 ms in duration, and each slot in a 40 ms frame (e.g., 3.75 kHz subcarrier spacing) may be 2 ms in duration.

Referring to FIG. 4A, each slot may be divided into $N_{NB}$ number of subcarriers that each have the same subcarrier spacing (e.g., 3.75 kHz, 7.5 kHz, or 15 kHz) and $N_{symb}$ of orthogonal frequency division multiplex (OFDM) symbols (e.g., 7 OFDM symbols).

Various NPUSCH formats may be used by a base station to allocate resources for one or more uplink transmissions from a UE. For example, a base station may use NPUSCH format 1 to allocate resources for uplink data transmissions (e.g., NPUSCH). When resources for an acknowledgement (e.g., NPUCCH or ACK/NACK) to a downlink transmission are allocated to a UE, NPUSCH format 2 may be used. For example, when a base station transmits an NPDCCH, NPUSCH format 2 may be used to allocate resources for an ACK/NACK response from a UE. The smallest unit a base station may use to map a transport block (TB) for either an NPUSCH, NPUCCH, and/or ACK/NACK may be a resource unit (RU).

For legacy NPUSCH format 2 (e.g. in FDD NB-IoT systems), the RU may be composed of a single subcarrier with a length of 4 slots. Consequently, for 3.75 kHz subcarrier spacing the RU has an 8 ms duration and for 15 kHz subcarrier spacing the RU has a 2 ms duration. An example of a legacy NPUSCH format 2 with an RU allocated in a single subcarrier is illustrated in slot structure 440 in FIG. 4A.

Uplink transmissions that are transmitted over different radio frames may experience a change in channel conditions, and the base station may not be able to properly decode an uplink transmission sent over different radio frames. In addition, sending uplink transmissions over different radio frames may also introduce a large delay in decoding the channel. There is a need to modify the legacy NPUSCH format 2 such that an uplink transmission received over different radio frame in a narrow-band TDD frame structure may be properly decoded by a base station.

To increase the chance of proper decoding at the base station, the present disclosure provides a modified NPUSCH format 2 structure may be used to allocate an RU in multiple subcarriers across multiple slots as illustrated in slot structure 450 in FIG. 4A. Although 4 subcarriers are illustrated in FIG. 4A as being allocated for the RU, any number of 2 or more subcarriers may be used for allocating the RU without departing from the scope of the present disclosure.

By increasing the number of carriers that are used for allocating an RU, the base station may have an increased chance of properly decoding an uplink transmission sent over different radio frames because more resource elements in each slot may be used to carry the uplink transmission and/or the RU may be allocated in one or two slots due to the increased number of resource elements allocated across multiple subcarriers, and hence, in some cases, avoid splitting the uplink transmission into discontinuous parts (e.g. spanning multiple radio frames).

Figure 5:
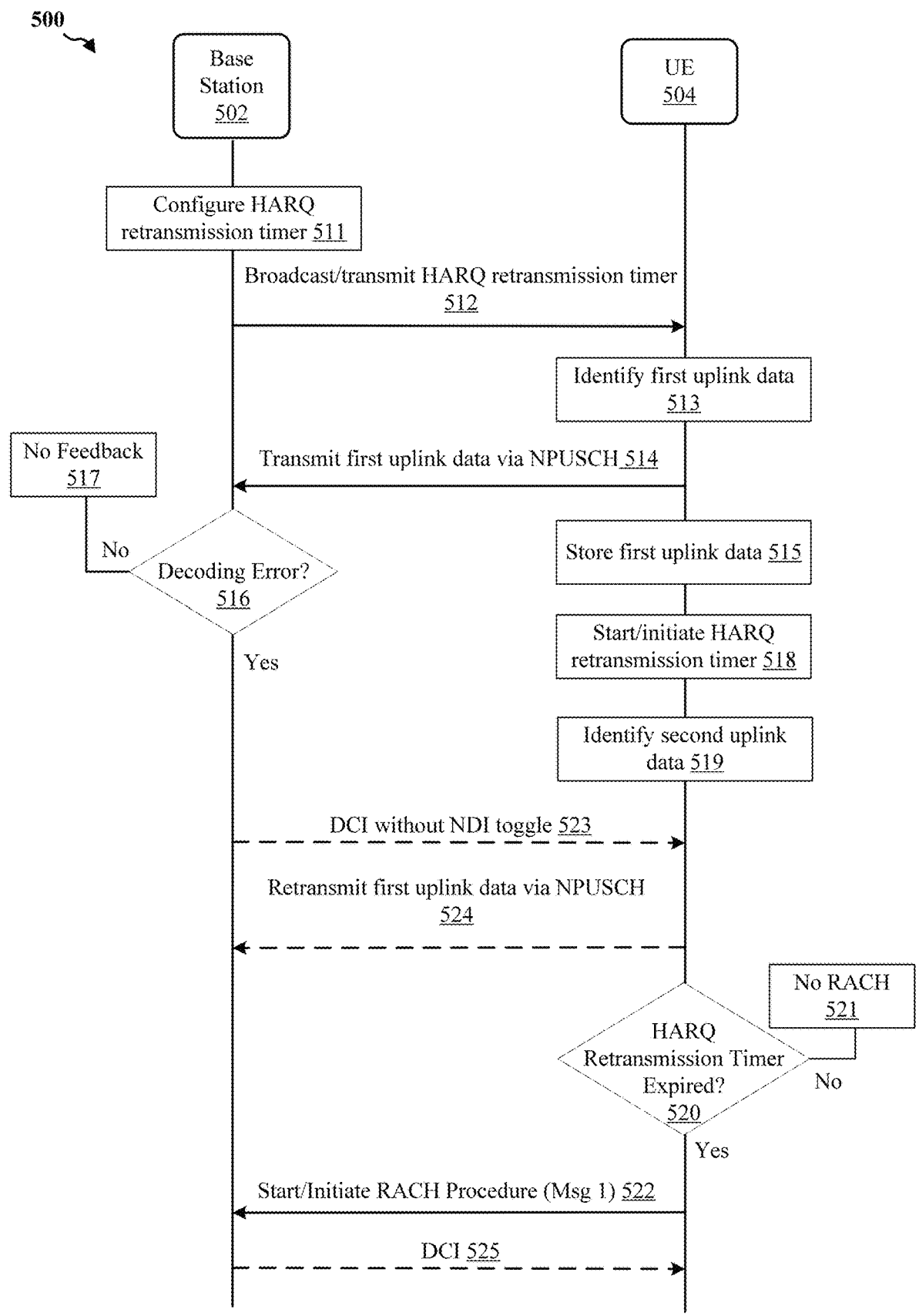
FIG. 5 illustrates a data flow for a narrow-band communication system(s) that may support HARQ retransmission timer, in accordance with various aspects of the present disclosure.

FIG. 5 illustrates a data flow 500 for configuring a HARQ retransmission timer in accordance with various aspects of the present disclosure. Base station 502 may correspond to, e.g., base station 102, 180, 310, 702 and 802. UE 504 may correspond to, e.g., UE 104, 350, 902 and 1002. In addition, the base station 502 and the UE 504 may be configured to communicate using narrow-band Internet of Things communications (e.g., NB-IoT and/or eMTC). For example, the UE 504 may be an NB-IoT device and/or an eMTC device.

In various aspects, base station 502 may configure 511 a hybrid automatic repeat request (HARQ) retransmission timer for narrow-band communications. For example, the base station 502 may configure 511 the HARQ retransmission timer having a time interval or duration. For example, during the time interval or duration of the HARQ retransmission timer, the UE 504 may not perform a random access (RACH) procedure when the UE 504 receives new uplink data for transmission.

In various aspects, the base station 502 may broadcast/transmit 512 the HARQ retransmission timer to the UE 504. For example, the base station 502 may configure the HARQ retransmission timer for the UE 504 and transmit the HARQ retransmission timer to the UE 504. In another aspect, the base station 502 may configure the HARQ retransmission timer for the UEs in a cell (including UE 504) and broadcast the HARQ retransmission timer for all the UEs in the cell. In an example, the base station 502 may broadcast the HARQ retransmission timer as part of the system information block (SIB). For example, the base station 502 may broadcast the HARQ retransmission timer as part of the SIB2.

In various aspects, the UE 504 (e.g., narrow-band Internet of Things communications (e.g., NB-IoT)) may be in a connected mode with the base station 502. For example, the UE 504 may be in a radio resource control (RRC) connection mode with the base station 502. The UE 504 (e.g., narrow-band Internet of Things communications (e.g., NB-IoT)) may identify 513 first uplink information (e.g., uplink data and/or uplink control information) for transmission to the base station 502. For example, the UE 504 may identify a priority level of the first uplink information (e.g., first uplink data and/or first uplink control information) for transmission to the base station 502.

In various aspects, the UE 504 may transmit 514 first uplink information (e.g., uplink data and/or uplink control information) to the base station 502. For example, the uplink information (e.g., uplink data and/or uplink control information) may be transmitted to the base station 502 via a narrow-band physical uplink shared channel (NPUSCH).

In various aspects, the UE 504 may store 515 the uplink information (e.g., uplink data and/or uplink control information) in a memory for HAQR retransmission. For example, the UE 504 may store 515 the uplink information (e.g., uplink data and/or uplink control information) in a buffer for HARQ retransmission in the event that a decoding error occurred at the base station 502.

In various aspects, the base station 502 may detect the NPUSCH and attempt to decode 516 the uplink information (e.g., uplink data and/or uplink control information) transmitted from the UE 504. If the base station 502 is successful (e.g., no error) in decoding 516 the ACK/NACK information, the base station 502 may not provide 517 any feedback to the UE 504.

In various aspects of the present disclosure, the UE 504 may, contemporaneous or subsequent to transmitting uplink information (e.g., uplink data and/or uplink control information) 514 and/or storing the uplink information (e.g., uplink data and/or uplink control information) 515, start/initiate 518 the HARQ retransmission timer. As described above, the UE 504 may receive a HARQ retransmission timer. For example the HARQ retransmission timer may indicate a time interval where the UE 504 may not initiate a RACH procedure after the transmission 514 of the uplink information (e.g., uplink data and/or uplink control information) to the base station 502 and/or the storage 515 of the uplink information (e.g., uplink data and/or uplink control information) in the memory of the user equipment 504 for narrow-band communications. The HARQ retransmission timer may allow the UE 504 to reduce the uncertainty due to a lack of HARQ feedback from the base station (as described above). Also, the HARQ retransmission timer may reduce a number of RACH procedures performed by the user equipment for narrow-band Internet of Things communications (e.g., NB-IoT) and therefore reduce the RACH load on the base station. Further, the HARQ retransmission timer may allow the HARQ retransmission to be successfully performed and therefore reduce the HARQ retransmission failure of the user equipment for narrow-band Internet of Things communications (e.g., NB-IoT).

In various aspects, the UE 504 may identify 519 second uplink information (e.g., uplink data and/or uplink control information) for uplink transmission. The UE 504 may identify 519 the second uplink information for uplink transmission before receiving an indication from the base station 502 of whether decoding 516 of the first uplink information was successful. For example, the second uplink information for uplink transmission may include control information and/or data information. The UE 504 may identify a priority level of the second uplink information. In another example, the second uplink information for uplink transmission may have a higher priority than the first uplink information transmitted/stored by the UE 504.

In various aspects, the UE 504 may determine 520 whether the HARQ retransmission timer has expired. For example, the UE 504 may not have an uplink grant to transmit the data on the uplink and/or a schedule request (SR) may not be available to the UE 504. In order to transmit the second identified data on the uplink, the UE 504 may perform a RACH procedure to transmit the data on the uplink. The HARQ retransmission timer may allow the UE 504 to complete the HARQ retransmission process and preventing discarding of the first uplink information stored in the memory/buffer.

The UE 504 may determine whether the HARQ retransmission timer has expired and determine whether to perform RACH procedure based at least in part on the determination of whether the HARQ retransmission timer has expired. For example, the UE 504 may determine 520 that the HARQ retransmission timer has not expired, the UE 504 may not perform 521 RACH procedure to transmit the second uplink data. In another example, the UE 504 may determine 520 that the HARQ retransmission timer has expired, the UE 504 may start/initiate 522 the RACH procedure (e.g., transmit a Msg 1 of the RACH procedure).

In various aspects, as optionally shown, if the base station 502 is not successful (e.g., cyclic redundancy checksum (CRC) error) in decoding 516 the first uplink information, the base station 502 may provide 523 downlink control information (DCI) including an uplink grant without a new data indicator (NDI) bit toggled to the UE 504.

In an aspect, as optionally shown, the UE 502 may retransmit 524 the first uplink information stored in the memory/buffer if the downlink control information (DCI) including an uplink grant is received without the NDI bit toggled.

In another aspect, as optionally shown, if the base station 502 was successful in decoding 516 the first uplink information and the base station 502 may decide to provide the UE 504 with an uplink grant for second uplink transmission, the base station 502 may provide 525 downlink control information (DCI) including an uplink grant. In an example, the downlink control information (DCI) may include an uplink grant and a NDI bit toggled to the UE 504. After receiving the uplink grant with the NDI bit, the UE 504 may discard the first uplink information stored in the memory/buffer.

Figure 6:
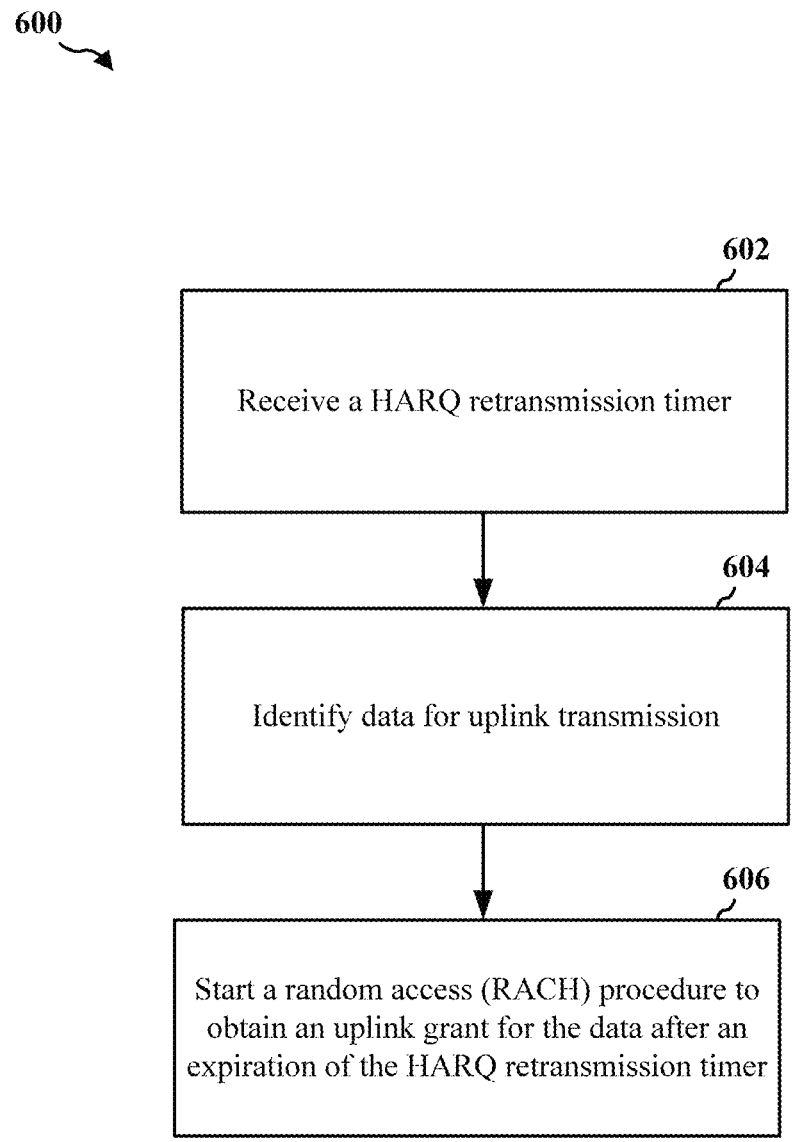
FIG. 6 is a flowchart of a method of narrow-band wireless communication, in accordance with various aspects of the present disclosure.

FIG. 6 is a flowchart 600 of a method of wireless communication in accordance with various aspects of the present disclosure. The method may be performed by a UE (e.g., the UE 104, 350, 504, 902 and 1002).

At block 602, the UE may receive information associated with HARQ retransmission timer. In one aspect, the UE may receive the HARQ retransmission timer via system information block (SIB) broadcasted by the base station. For example, the UE may receive the HARQ retransmission timer via SIB2. In another aspect, the UE may receive the HARQ retransmission timer via a radio resource control (RRC) message from the base station.

At 604, the UE may identify data for uplink transmission. For example, the UE may identify second data for uplink transmission after transmitting the first uplink data to the base station. In another example, the second data for uplink transmission may have a higher priority than the second uplink information.

At 606, the UE may start a random access (RACH) procedure to obtain an uplink grant for the data after an expiration of the HARQ retransmission timer. For example, the UE may start the RACH procedure by transmitting Msg 1 or RACH preamble to the base station. For example, the UE may determine whether the HARQ retransmission timer has expired. In an aspect, the UE may determine not to perform a random access (RACH) procedure based at least in part on the determination that the HARQ retransmission timer has not expired. In another aspect, the UE may determine to perform a random access (RACH) procedure based at least in part on the determination that the HARQ retransmission timer has expired.

Figure 7:
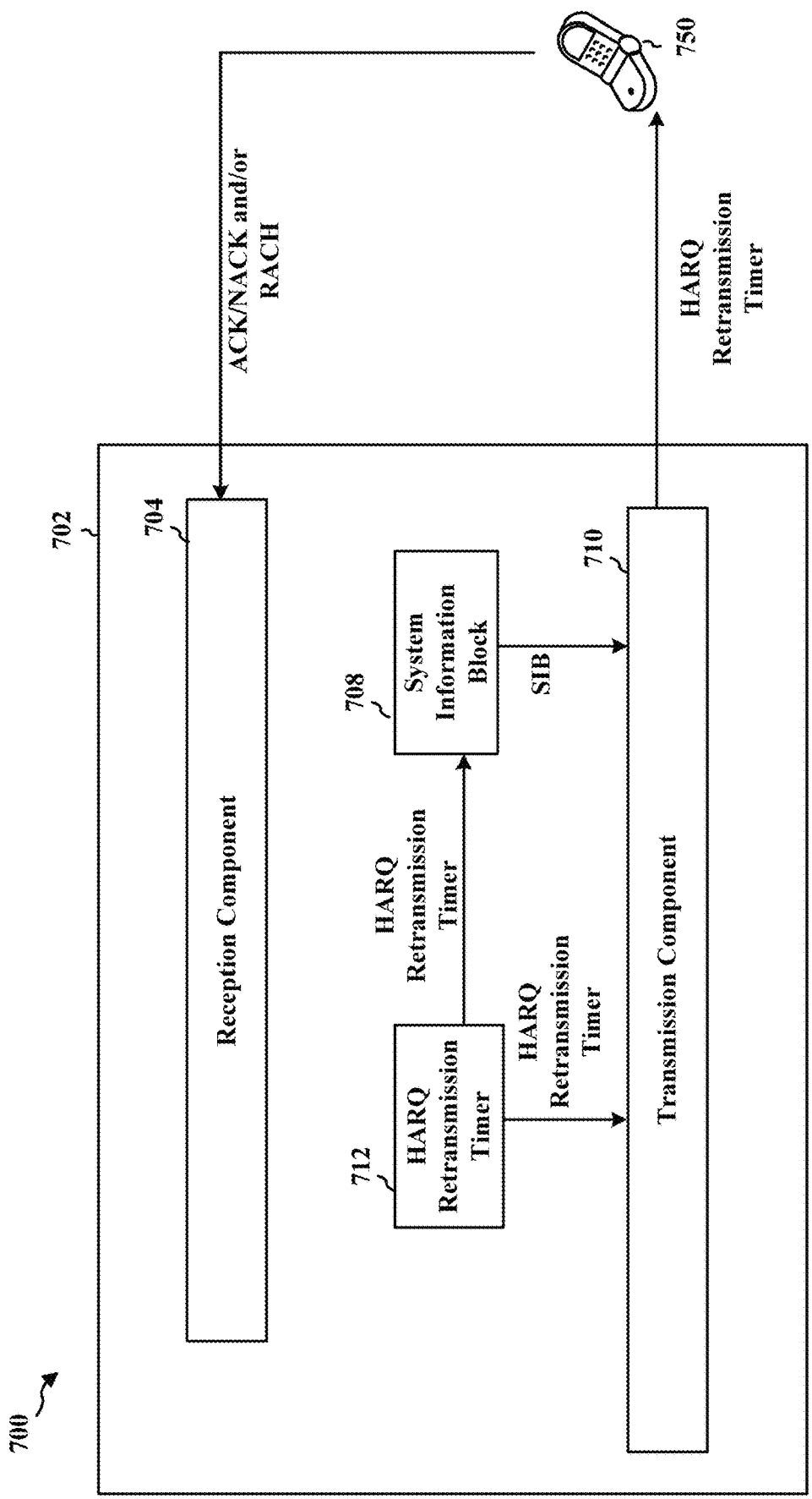
FIG. 7 is a conceptual data flow diagram illustrating the data flow between different means/components in an exemplary apparatus, in accordance with various aspects of the present disclosure.

FIG. 7 is a conceptual data flow diagram 700 illustrating the data flow between different means/components in an exemplary apparatus 702. The apparatus may be a base station (e.g., the base station 102, 180, 502, 310, and 802) in communication with a UE 750 (e.g., the UE 104, 350, 504, 902 and 1002).

The apparatus may include a reception component 704, system information block (SIB) component 708, transmission component 710, and/or a HARQ retransmission timer component 712.

In certain configurations, the HARQ retransmission timer component 712 may be configured to determine a time interval for allocating to the UE 750 for a HARQ retransmission procedure. The HARQ retransmission timer component 712 may be configured to send a signal associated with the HARQ retransmission timer to the transmission component 710 and/or the system information block component 708.

In certain configurations, the system information block component 708 may be configured to include the HARQ retransmission timer in the system information block. The system information block component 708 may be configured to send a signal associated with the system information block having a HARQ retransmission timer to the transmission component 710.

In certain configurations, the transmission component 710 may be configured to transmit information associated with the system information block and/or the HARQ retransmission timer to the UE 750.

In certain configurations, the reception component 704 may be configured to receive first and/or second uplink information via one or more of a NPUCCH and/or a NPUSCH from the UE 750.

The apparatus may include additional components that perform each of the blocks of the algorithm in the aforementioned data flowchart of FIG. 5. As such, each block in the aforementioned data flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
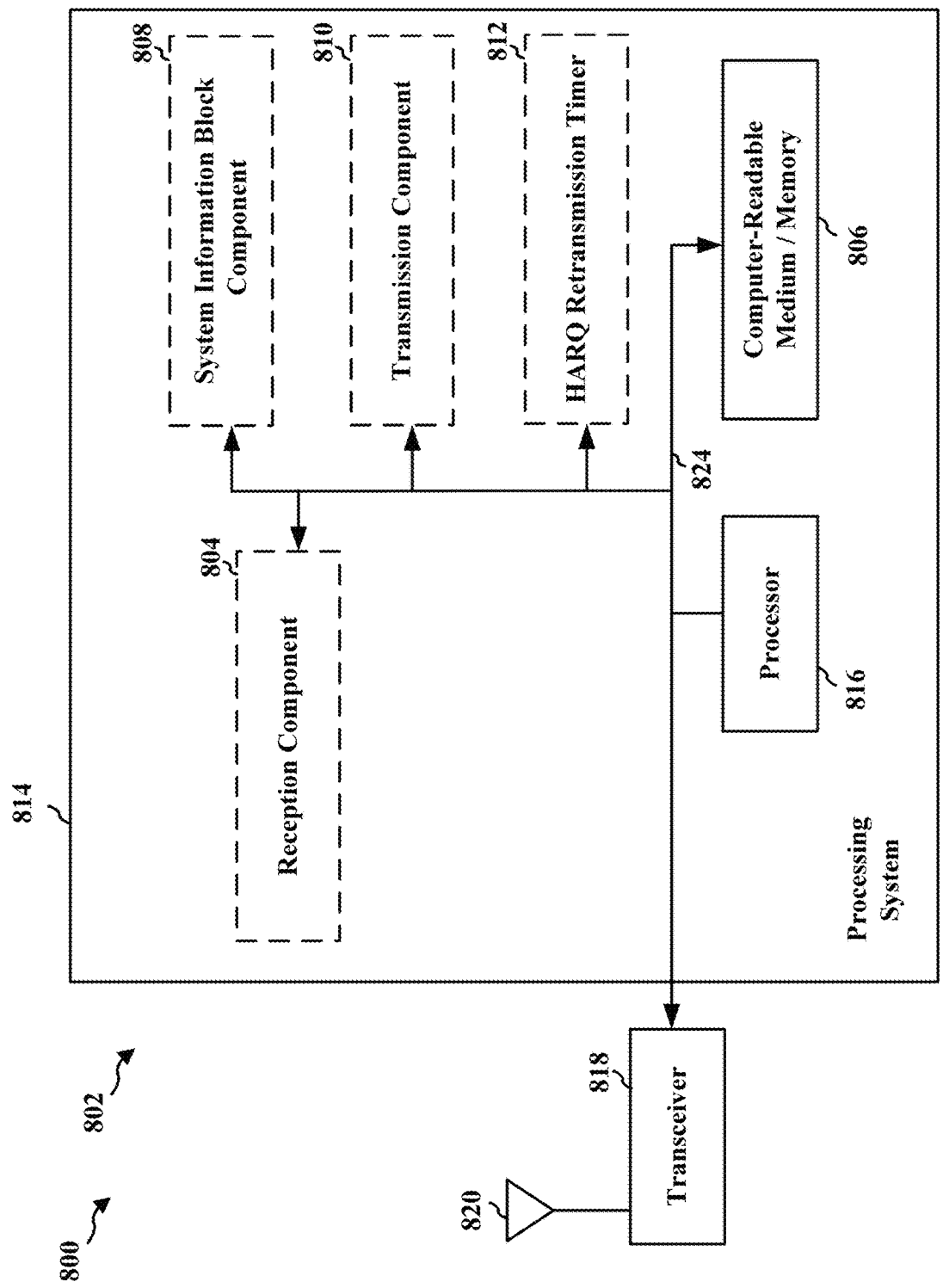
FIG. 8 is a diagram illustrating an example of a hardware implementation for an apparatus employing a processing system, in accordance with various aspects of the present disclosure.

FIG. 8 is a diagram 800 illustrating an example of a hardware implementation for an apparatus 802 employing a processing system 814 in accordance with various aspects of the present disclosure. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 816, the components 804, 808, 810, 812 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 818. The transceiver 818 is coupled to one or more antennas 820. The transceiver 818 provides a means for communicating with various other apparatus over a transmission medium. The transceiver 818 receives a signal from the one or more antennas 820, extracts information from the received signal, and provides the extracted information to the processing system 814, specifically the reception component 804. In addition, the transceiver 818 receives information from the processing system 814, specifically the transmission component 810, and based on the received information, generates a signal to be applied to the one or more antennas 820. The processing system 814 includes a processor 816 coupled to a computer-readable medium/memory 806. The processor 816 is responsible for general processing, including the execution of software stored on the computer-readable medium/memory 806. The software, when executed by the processor 816, causes the processing system 814 to perform the various functions described supra for any particular apparatus. The computer-readable medium/memory 806 may also be used for storing data that is manipulated by the processor 816 when executing software. The processing system 814 further includes at least one of the components 804, 808, 810, 812. The components may be software components running in the processor 816, resident/stored in the computer readable medium/memory 806, one or more hardware components coupled to the processor 816, or some combination thereof. The processing system 814 may be a component of the eNB 310 and may include the memory 376 and/or at least one of the TX processor 316, the RX processor 370, and the controller/processor 375.

The aforementioned components of the apparatus 802 and/or the processing system 814 configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
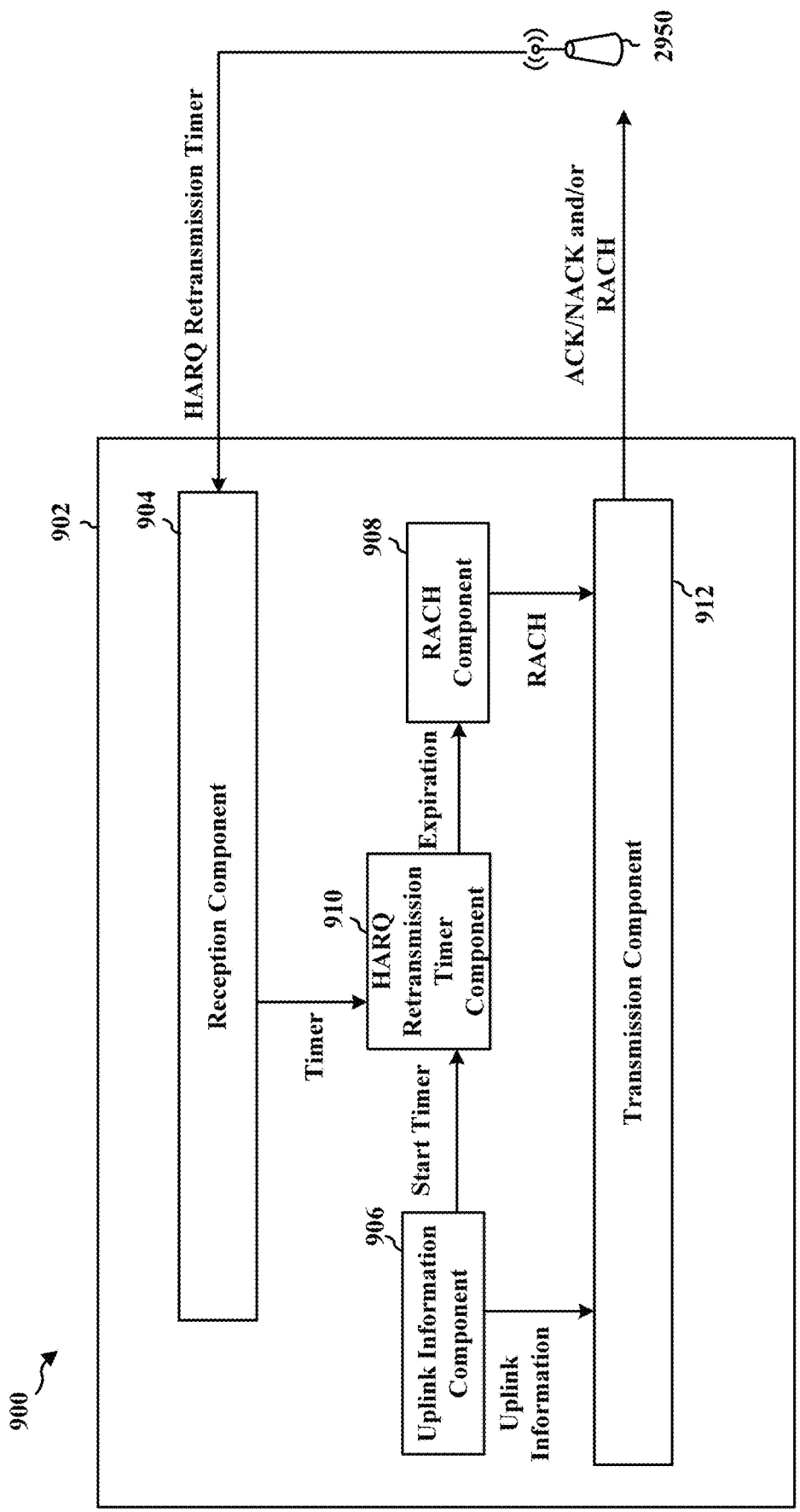
FIG. 9 is a conceptual data flow diagram illustrating the data flow between different means/components in an exemplary apparatus, in accordance with various aspects of the present disclosure.

FIG. 9 is a conceptual data flow diagram 900 illustrating the data flow between different means/components in an exemplary apparatus 902 in accordance with various aspects of the present disclosure. The apparatus may be a UE (e.g., the UE 104, 350, 504, 902 and 1002) in narrow-band Internet of Things communication (e.g., NB-IoT communication or eMTC) with base station 950 (e.g., the base station 102, 180, 502, 702 and 802). The apparatus may include a reception component 904, an uplink information component 906, a HARQ retransmission timer 908, a random access (RACH) component 910, and a transmission component 912.

In certain configurations, the reception component 904 may be configured to receive information associated with a HARQ retransmission timer for narrow-band Internet of Things (e.g., NB-IoT) communications. The reception component 904 may be configured to send a signal associated with the HARQ retransmission timer to the HARQ retransmission timer component 910.

In certain configurations, the RACH component 908 may be configured to perform RACH procedure. The RACH component 908 may be configured to send a signal associated with the RACH procedure to the transmission component 912.

In certain configurations, the uplink information component 906 may be configured to generate and/or identify first uplink information for transmission to the base station 950. The uplink information component 906 may be configured to store the first uplink information. The uplink information component 906 may be configured to generate and/or identify second uplink information for transmission to the base station 950. For example, the second uplink information may have a higher priority than the first uplink information. The uplink information component 906 may be configured to send a signal associated with the first and/or second uplink information to the HARQ retransmission timer component 910 and/or the transmission component 912.

In certain configurations, the HARQ retransmission timer component 910 may be configured to determine whether the HARQ retransmission timer has expired. In one aspect, the HARQ retransmission timer component 910 may determine that the HARQ retransmission timer has not expired and the HARQ retransmission timer component 910 may determine not to start/initiate a RACH procedure. In another aspect, the HARQ retransmission timer component 910 may determine that the HARQ retransmission timer has expired, the HARQ retransmission timer component 910 may determine to start/initiate a RACH procedure. For example, UE may start the RACH procedure by transmitting Msg 1 or RACH preamble to the base station. The HARQ retransmission timer component 910 may be configured to send a signal associated with the HARQ retransmission timer to the RACH component 908.

In certain configurations, the transmission component 912 may be configured to transmit first and/or second uplink information and/or RACH messages to the base station 950.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
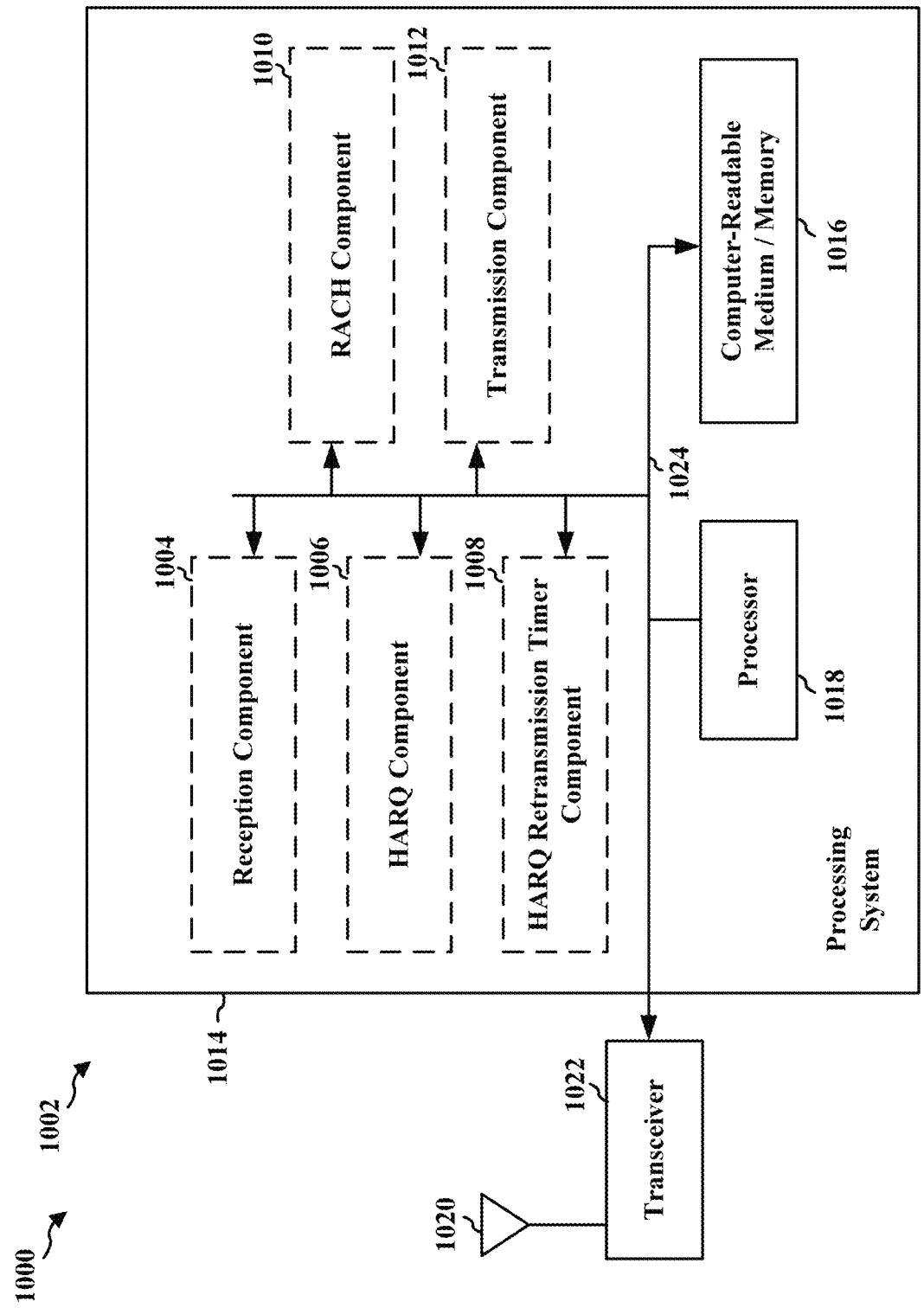
FIG. 10 is a diagram illustrating an example of a hardware implementation for an apparatus employing a processing system, in accordance with various aspects of the present disclosure.

FIG. 10 is a diagram 1000 illustrating an example of a hardware implementation for an apparatus 1002 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1018, the components 1004, 1006, 1008, 1010, 1012 and the computer-readable medium/memory 1016. The bus 1024 may also link various other circuits such as timing sources, peripherals, voltage regulators, and power management circuits, which are well known in the art, and therefore, will not be described any further.

The processing system 1014 may be coupled to a transceiver 1022. The transceiver 1022 is coupled to one or more antennas 1020. The transceiver 1022 provides a means for communicating with various other apparatus over a transmission medium. The transceiver 1022 receives a signal from the one or more antennas 1020, extracts information from the received signal, and provides the extracted information to the processing system 1014, specifically the reception component 1004. In addition, the transceiver 1022 receives information from the processing system 1014, specifically the transmission component 1012, and based on the received information, generates a signal to be applied to the one or more antennas 1020. The processing system 1014 includes a processor 1018 coupled to a computer-readable medium/memory 1016. The processor 1018 is responsible for general processing, including the execution of software stored on the computer-readable medium/memory 1016. The software, when executed by the processor 1018, causes the processing system 1014 to perform the various functions described supra for any particular apparatus. The computer-readable medium/memory 1016 may also be used for storing data that is manipulated by the processor 1018 when executing software. The processing system 1014 further includes at least one of the components 1004, 1006, 1008, 1010, 1012. The components may be software components running in the processor 1018, resident/stored in the computer readable medium/memory 1016, one or more hardware components coupled to the processor 1018, or some combination thereof. The processing system 1014 may be a component of the UE 350 and may include the memory 360 and/or at least one of the TX processor 368, the RX processor 356, and the controller/processor 359.

In certain configurations, the apparatus 1002 for wireless communication may include means for receiving a hybrid automatic repeat request (HARQ) retransmission timer, the HARQ retransmission timer indicates a time interval. In certain other configurations, the apparatus 1002 for wireless communication may include means for identifying data for uplink transmission. In certain configuration, the apparatus 1002 for wireless communication may include means for starting, after expiration of the HARQ retransmission timer, a random access procedure to obtain an uplink grant for the data. The aforementioned means may be one or more of the aforementioned components of the apparatus 1002 and/or the processing system 1014 configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE), comprising:
    receiving, by the UE, control signaling indicating a hybrid automatic repeat request (HARQ) retransmission timer, the HARQ retransmission timer indicating a time interval between a transmission of uplink information and a start of a random access procedure;
    identifying, by the UE, data for uplink transmission; and
    starting, by the UE and after expiration of the HARQ retransmission timer, the random access procedure to obtain an uplink grant for transmitting the data.

2. The method of claim 1, wherein the UE is a narrowband communication device.

3. The method of claim 1, wherein the HARQ retransmission timer is indicated in a system information block (SIB), wherein the SIB is SIB2.

4. The method of claim 1, wherein the UE is in a connected mode.

5. The method of claim 1, further comprising:
determining whether the HARQ retransmission timer has expired; and
waiting to start the random access procedure based at least in part on the determination that the HARQ retransmission timer has not expired.

6. The method of claim 1, further comprising:
transmitting the uplink information to a base station; and
storing the uplink information.

7. The method of claim 6, wherein the data for uplink transmission is identified after transmitting the uplink information to the base station.

8. The method of claim 1, wherein the data for uplink transmission has a higher priority than the uplink information.

9. An apparatus for wireless communication, comprising:
a memory; and
one or more processors operatively coupled to the memory, the one or more processors configured to:
receive control signaling indicating a hybrid automatic repeat request (HARQ) retransmission timer, the HARQ retransmission timer indicating a time interval between a transmission of uplink information and a start of a random access procedure;
identify data for uplink transmission; and
start, after expiration of the HARQ retransmission timer, the random access procedure to obtain an uplink grant for transmitting the data.

10. The apparatus of claim 9, wherein the apparatus is a narrow-band communication device.

11. The apparatus of claim 9, wherein the HARQ retransmission timer is indicated in a system information block (SIB), and wherein the SIB is SIB2.

12. The apparatus of claim 9, wherein the apparatus is in a connected mode.

13. The apparatus of claim 9, the one or more processors further configured to:
determine whether the HARQ retransmission timer has expired; and
wait to start the random access procedure based at least in part on the determination that the HARQ retransmission timer has not expired.

14. The apparatus of claim 9, the one or more processors further configured to:
output the uplink information for transmission to a base station; and
store the uplink information.

15. The apparatus of claim 14, wherein the data for uplink transmission is identified after transmitting the uplink information to the base station.

16. The apparatus of claim 9, wherein the data for uplink transmission has a higher priority than the uplink information.

17. An apparatus for wireless communication, comprising:
means for receiving control signaling indicating a hybrid automatic repeat request (HARQ) retransmission timer, the HARQ retransmission timer indicating a time interval between a transmission of uplink information and a start of a random access procedure;
means for identifying data for uplink transmission; and
means for starting, after expiration of the HARQ retransmission timer, the random access procedure to obtain an uplink grant for transmitting the data.

18. The apparatus of claim 17, wherein the apparatus is a narrow-band communication device.

19. The apparatus of claim 17, the HARQ retransmission timer is indicated in a system information block (SIB), wherein the SIB is SIB2.

20. The apparatus of claim 17, wherein the apparatus is in a connected mode.

21. The apparatus of claim 17, further comprising:
means for determining whether the HARQ retransmission timer has expired; and
means for waiting to start the random access procedure based at least in part on the determination that the HARQ retransmission timer has not expired.

22. The apparatus of claim 17, further comprising:
means for transmitting the uplink information to a base station; and
means for storing the uplink information.

23. The apparatus of claim 22, wherein the data for uplink transmission is identified after transmitting the uplink information to the base station.

24. The apparatus of claim 17, wherein the data for uplink transmission has a higher priority than the uplink information.

25. A user equipment, comprising:
a transceiver configured to receive control signaling indicating a hybrid automatic repeat request (HARQ) retransmission timer, the HARQ retransmission timer indicating a time interval between a transmission of uplink information and a start of a random access procedure;
a memory; and
one or more processors operatively coupled to the memory, the one or more processors configured to:
identify data for uplink transmission; and
start, after expiration of the HARQ retransmission timer, the random access procedure to obtain an uplink grant for transmitting the data.

26. The user equipment of claim 25, wherein the user equipment is a narrow-band communication device.

27. The user equipment of claim 25, wherein the HARQ retransmission timer is indicated in a system information block (SIB), and wherein the SIB is SIB2.

28. The user equipment of claim 25, wherein the user equipment is in a connected mode.

29. The user equipment of claim 25, the one or more processors further configured to:
determine whether the HARQ retransmission timer has expired; and
wait to start the random access procedure based at least in part on the determination that the HARQ retransmission timer has not expired.

30. The user equipment of claim 25, wherein:
the transceiver is further configured to transmit the uplink information to a base station; and
the one or more processors are further configured to store the uplink information.

* * * * *